United States Patent [19]
Bronicki et al.

[11] Patent Number: 5,571,490
[45] Date of Patent: Nov. 5, 1996

[54] METHOD AND MEANS FOR EXPLOITING FUEL HAVING HIGH SULFUR CONTENT

[75] Inventors: Lucien Y. Bronicki, Yavne; Benjamin Doron, Jerusalem, both of Israel

[73] Assignee: Ormat, Inc., Sparks, Nev.

[21] Appl. No.: 197,551

[22] Filed: Feb. 17, 1994

Related U.S. Application Data

[63] Continuation of Ser. No. 835,358, Feb. 14, 1992, abandoned, which is a continuation of Ser. No. 683,690, Apr. 11, 1991, abandoned.

[51] Int. Cl.$^6$ .................................. B01J 8/00; C01B 7/00; F23J 11/00
[52] U.S. Cl. ............................. 423/244.01; 423/244.05; 423/244.08; 110/345; 110/347; 110/229
[58] Field of Search .................................. 110/345, 347, 110/229; 423/244 A, 244 R, 242 A, 242 R, 244.01, 244.05, 244.07, 244.08

[56] References Cited

U.S. PATENT DOCUMENTS

| | | | |
|---|---|---|---|
| 2,928,718 | 3/1960 | Berglund et al. | 23/1 |
| 4,086,962 | 5/1978 | Cha | 423/244 A |
| 4,110,064 | 8/1978 | Vorona et al. | 431/171 |
| 4,165,717 | 8/1979 | Ren et al. | 122/4 D |
| 4,181,705 | 1/1980 | Gumermaw | 110/345 |
| 4,185,080 | 6/1980 | Rechmeier | 423/242 A |
| 4,211,606 | 7/1980 | Ponomarev et al. | 201/12 |
| 4,373,454 | 2/1983 | Pitrolo et al. | 110/347 |
| 4,388,877 | 6/1983 | Molayew et al. | 110/345 |
| 4,544,478 | 10/1985 | Kelley | 208/427 |
| 4,601,657 | 6/1986 | Hewiw et al. | 110/347 |
| 4,648,965 | 3/1987 | McMath, Jr. | 208/247 |
| 4,700,639 | 10/1987 | Esterson et al. | 110/347 |
| 4,961,756 | 10/1990 | Rich, Jr. | 44/605 |
| 4,981,667 | 1/1991 | Berg et al. | 423/244 |
| 5,327,708 | 12/1994 | Gwertz | 208/434 |

FOREIGN PATENT DOCUMENTS

| | | |
|---|---|---|
| 0184847 | 6/1986 | European Pat. Off. . |
| 1550308 | 11/1968 | France . |
| 3426879 | 1/1985 | Germany . |
| 68149 | 3/1983 | Israel . |
| 544826 | 1/1977 | U.S.S.R. . |
| 544826 | 2/1977 | U.S.S.R. . |
| 84/03516 | 9/1984 | WIPO . |
| 91/04310 | 4/1991 | WIPO . |

OTHER PUBLICATIONS

G. Esterson et al. *Generation of Energy from Shale of Isreal: The Genesis Process.* The Energy Center, The Hebrew University. Sep. 1984. p. 40.

"Combustion of Solid Fuel in Air–fluidized Bed," by V. A. Borodulya and L. M. Vinogradov, *Nauka i Teknika* 1980, pp. 171–172 and English Language Translation thereof.

"Protection of Water and Air Basins from Effluents of Heat Electric Stations," by L. A. Rikhter, E. P. Volkov and V. N. Pokrovsky, *Energoizdat*, 1981, pp. 62–64 and English Language Translation thereof.

Extracts from "Genesis Final Report" dated Sep. 30, 1984. English Language Translation of Russian Office Action dated Nov. 26, 1993.

J. M. Beer, "Institute of Energy: 51st Melchett Lecture, Clean combustion of coal, research and applications. An overview of recent developments in the USA," *Journal of the Institute of Energy*, 3, Mar. 1986.

G. Flament and S. Michelfelder, "Simultaneous reduction of NOx and SO2 in pulverized coal flames by application of staged combustion and direct injection of Lime," *Revue Général de Thermique* 21, No. 248–249, pp. 649–663 (1982).

(List continued on next page.)

*Primary Examiner*—Gary P. Straub
*Attorney, Agent, or Firm*—Donald M. Sandler

[57] ABSTRACT

High sulfur content fuel is combusted in the presence of oil shale containing significant amounts of calcium carbonate so that the sulfur and calcium carbonate oxidize and react to form calcium sulfate particulate which captures the sulfur and in the fuel and prevents its release to the atmosphere.

24 Claims, 1 Drawing Sheet

OTHER PUBLICATIONS

N. A. Burdett et al. "The application of direct Limestone injection to UK power stations," *Journal of the Institute of Energy*, 64, Jun. 1985.

English language translation of Search Report issued by the Russian Patent Office.

"Final Report– Generation of Energy from Shale of Israel: The Genesis Process (Project No. 82–2–12)," Prepared by Prof. G. Esterson, Dr. M. Pismen and Prof. Z. Aizenshtat. Prepared for Ministry of Energy and Infrastructure, State of Isreal, 30 Sep. 1984.

Turkish Search Report and Annex.

A. B. Vol–Epshtein et al., "Thermal Dissolution of Baltic Combustible Shales in a Flow–through Apparatus" (Khimiya Tvendogo Tapila, vol. 14, 2, 67–70, 1980)–English translation.

Chemical Abstracts 96:145902 n.

METHOD AND MEANS FOR EXPLOITING FUEL HAVING HIGH SULFUR CONTENT

This application is a continuation, of application Ser. No. 07/835,358 filed Feb. 14, 1992, now abandoned, which is a continuation of application Ser. No. 07/683,690, filed Apr. 11, 1991, now abandoned.

BACKGROUND OF THE INVENTION

1. Technical Field

The present invention relates to a method of and apparatus for exploiting fuel having a high sulfur content, and more particularly, to exploiting high sulfur content oil.

2. Background

Environmental considerations restrict the use of fuels having a high sulfur content, particularly oil. This is particularly the case for high capacity power plants where use of high sulfur content fuel is curtailed in order to avoid the release into the atmosphere of oxides of sulfur produced by the combustion of such fuel. The presence of oxides of sulfur in the atmosphere is a main cause of acid rain which falls on the earth when the oxides dissolve in atmospheric water during precipitation. Very large geographic areas are adversely affected by acid rain in many parts of the world. So serious is the problem that international efforts are under way in an effort to ameliorate this problem.

One solution to the deleterious effects of acid rain on vegetation, buildings, vehicles, and people, in the affected area, is to require power plants to burn low sulfur content fuels, such as low sulfur content oil. This increases the already high demand for low sulfur fuels thus increasing the cost of these fuels because reserves of low sulfur content fuels, particularly crude oil, and their production is limited. Consequently, much of the crude oil extracted today is high in sulfur content; and to utilize this crude for fuel requires expensive desulfurization by the refinery to produce what is termed low sulfur fuel for power plants. Being in short supply, this fuel is expensive, and supplies thereof are not reliable.

An alternative approach to reducing acid rain is to install expensive scrubbers in the stacks of power plants to permit the use high sulfur content fuel and at the same time to prevent the release of sulfur compounds into the air. In either case, the economic cost for reducing acid rain is large.

It is therefore an object of the present invention to provide a new and improve method for economically exploiting high sulfur content fuel, such as oil, such that the release of sulfur into the atmosphere is reduced or substantially prevented.

BRIEF DESCRIPTION OF THE INVENTION

According to the present invention, high sulfur content fuel is combusted in the presence of oil shale containing significant amounts of calcium carbonate so that the sulfur and calcium carbonate oxidize and react to form calcium sulfate particulate which captures the sulfur and in the fuel and prevents its release to the atmosphere.

The burning of high sulfur content fuel includes the steps of burning or combusting the high sulfur content fuel in the presence of, or together with a low heat content fuel containing significant amounts of carbonate, usually in the form of calcium carbonate. Preferably, the high sulfur content fuel is mixed with the fuel containing significant amounts of carbonate prior to combustion such that the mixture is burned. The calcium carbonate and sulfur oxidize and react to bind the sulfur to the calcium.

The chemical binding that occurs produces calcium sulfate which is a particulate material that can be entrained or captured in a conventional separator associated with a stack of a power plant, for example thereby preventing the release of sulfur compounds into the atmosphere.

Instead of preparing CaCO or $CaCO_3$ in a separate process for capturing sulfur in the combustion process, the present invention involves the direct use of fuel containing significant amounts of calcium carbonate, such as oil shale, directly in the combustion process. In this way, expensive preparation processes are eliminated. Furthermore, in accordance with the invention, the oil shale itself provides energy which is more than sufficient for producing the required CaCO because it is combusted together with the high sulfur content fuel.

The fuel containing the carbonate may be oil shale which contains calcium carbonate. Alternatively, the fuel may be peat, or a low grade coal that contains significant amount of calcium carbonate.

BRIEF DESCRIPTION OF THE DRAWINGS

Embodiments of the present invention are shown by way of examples in the accompanying drawings wherein.

DETAILED DESCRIPTION OF THE INVENTION

Generally speaking, oil shale is not an economical fuel, especially for use in high capacity power plants that produce electricity. However, this fuel does contain significant amounts of calcium and magnesium carbonate which are useful in absorbing sulfur during combustion with high sulfur fuels. According to the invention, a high sulfur content fuel, such as conventional residual oil used in power plants, is combusted with low grade fuel, such as oil shale, containing significant amounts of calcium carbonate. Usually, oil shale contains large amounts of calcium carbonate (sometimes up to 60%) and some magnesium carbonate. Such high sulfur content fuel often contains as much as 8% by volume of sulfur.

In the combustion process, the calcium and sulfur oxidize and react to form calcium sulfate which is a particulate material. The chemical reactions between calcium and sulfur can proceed in a number of ways. Examples of such reactions are:

$CaCO_3 \rightarrow CaO + CO$ followed by $CaO + SO_2 \rightarrow CaSO_3$ or $CaCO_3\ MgO + SO_2 \rightarrow CaSO_3\ MgO + CO_2$.

The calcium sulfite ($CaSO_3$) so formed usually the produces calcium sulfate as follows:

$2CaSO_3 + O_2 \rightarrow 2CaSO_4$ or by $8CaSO_3\ MgO \rightarrow 6CaSO_3\ MgO + 2CaS\ MgO + 3O_2$ and $CaS\ MgO + 2O_2 \rightarrow CaSO_4\ MgO$.

Furthermore, sulfate may be produced by:

$CaO + SO_3 \rightarrow CaSO_4$.

A magnesium carbonate component can also form some sulfate.

By conventional means, such as a cyclone separator, this particulate material is separated from the flue gases produced by the combustion process. Thus, while the oil shale, or low grade fuel, normally would not be suitable for use as fuel in a high capacity power plant, these fuels, when combusted with conventional, high sulfur content fuel, like residual oil, produce sufficient heat for utilization in a high capacity power plant. The combination of low grade fuel with high sulfur containing fuels permits the latter to be used without the need for scrubbers and separators which are required when high sulfur containing fuels are used alone.

Figure 1:
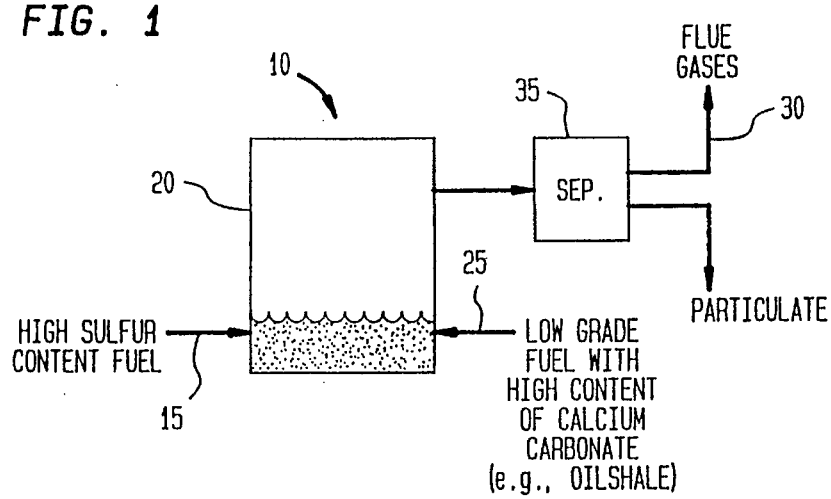
FIG. 1 is a block diagram of one embodiment of the present invention.

Referring now to the drawing, reference numeral 10 in FIG. 1 represents apparatus for combusting high sulfur content fuel, such as residual oil, in the presence of low grade fuel, such as shale oil in accordance with the present invention. High sulfur content fuel is supplied to combustion chamber 20 via input 15, and low grade fuel that has a high content of calcium carbonate is supplied to combustion chamber 20 via input 25. As a result of the combustion process that occurs in chamber 20, the calcium carbonate in the low grade fuel reacts with sulfur from the high sulfur content fuel to produce calcium sulfate in particulate form. This particulate can be extracted from the flue gases that pass through stack 30 by separation means 35 which may be a cyclone separator, scrubber, etc.

Figure 2:
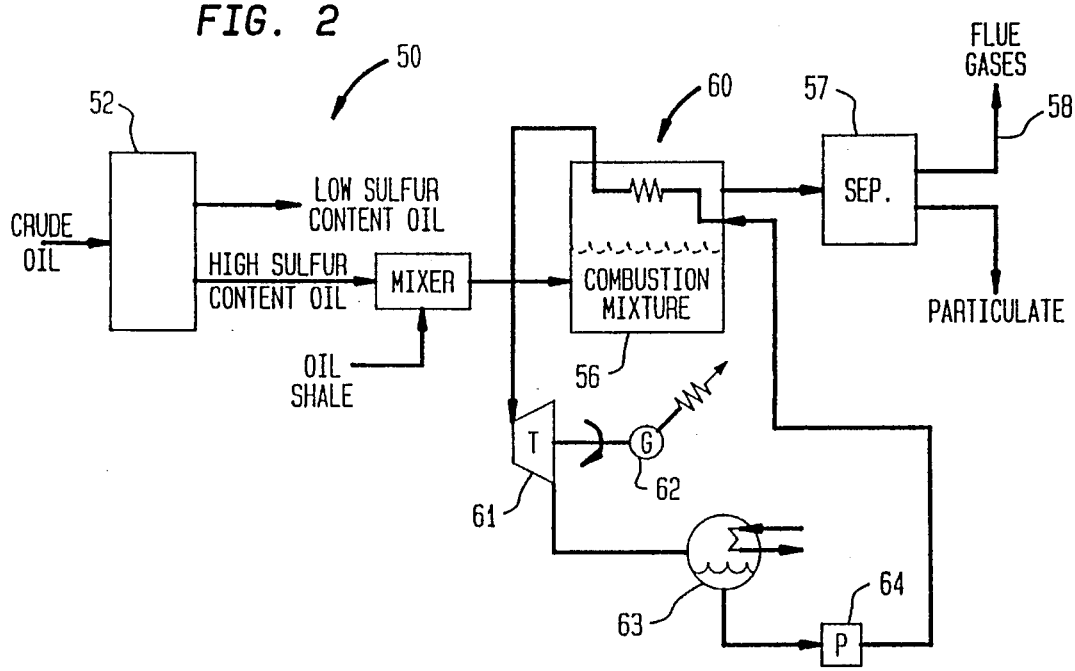
FIG. 2 is a block diagram of another embodiment of the invention showing incorporation of the present invention into a power plant.

Turning now to FIG. 2, one embodiment of the present invention is shown as apparatus 50 which includes conventional distillation apparatus 52 in which high sulfur crude oil is desulfurized in a conventional process to produce sweet, low sulfur, oil and other fractions, as well as a small amount, typically 5%, of residual oil that has a very high sulfur content. The residual oil may be burned in power plant 60 without releasing sulfur into the atmosphere, by using mixer 54 to first mix the high sulfur bearing residual oil with a low grade fuel such as oil shale, containing significant amounts of calcium carbonate. The mixture is supplied to the combustion chamber of boiler 56 wherein combustion takes place. As set forth above, the combustion process oxidizes the calcium and sulfur which then react to form calcium sulfate which is particulate material that can be extracted from the flue gases by conventional separator 57. The flue gases pass through stack 58, and the particulate are collected from the separator.

Steam produced in boiler 56 drives turbine 61 for producing electrical power via generator 62. Heat depleted steam is condensed in condenser 63 and the condensate produced is returned to the boiler by cycle pump 64.

Figure 3:
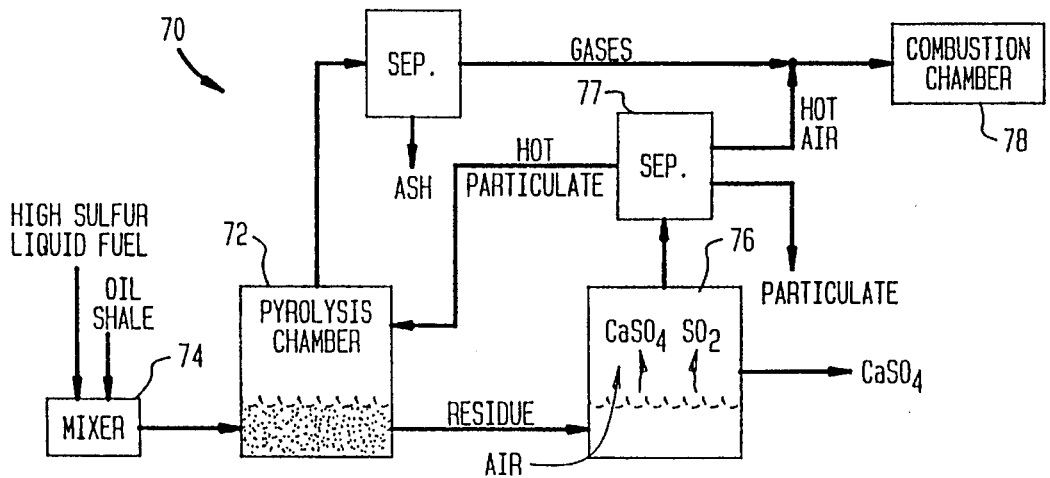
FIG. 3 is a block diagram of a further embodiment of the invention.

When residual oil or liquid fuel is to be combusted with the fuel containing calcium carbonate, the combustion is preferably carried out in a two stage system such as shown by reference numeral 70 in FIG. 3. Chamber 72 of system 70 is a pyrolyzer that pyrolyzes a mixture of oil shale and high sulfur liquid after mixing has been carried out in mixer 74. Chamber 72 produces combustible gases and a carbonaceous residue. Chamber 76 of system 70 provides for combusting the residue produced by chamber 72 with excess air. Calcium carbonate together with ash and calcium oxide, produced by the pyrolysis process carried out in chamber 72, is transferred to chamber 76 wherein the calcium carbonate and calcium oxide react to form calcium sulfate. The products of combustion formed in chamber 76 are applied to separator 77 which separates from the products of combustion, hot coarse ash. At least a portion of this hot coarse ash is applied to pyrolyzer chamber 72 to provide the heat necessary to effect pyrolyzation. Excess air in chamber 76 is heated and transmitted, together with the products of combustion nd fine ash, and with gases from chamber 72, to combustion chamber 78 which may be part of a boiler as shown in FIG. 2.

While the above description specifies oil shale as an example of a low grade fuel, peat, and low grade coal containing calcium carbonate can also be used in accordance with the present invention for combustion in the presence of high sulfur content fuels such as residual fuel oil, to produce calcium sulfate in a manner similar to that described above. Peat and low grade coal usually small quantities of sulfur as well as relatively high quantities of calcium carbonate. Thus the present invention provides a practical way to economically utilize these relatives abundant natural resources as fuel.

Furthermore, while residual oil is specified as an example of a high sulfur content fuel, the present invention can make possible the use of other high sulfur content fuels, such as certain coals containing high levels of sulfur which otherwise would not be used for ecological reasons. By using the methods and apparatus of the present invention, such coals can be combusted together with low sulfur content fuels such that the calcium carbonate contained therein converts the sulfur in the coal into particulate calcium sulfate. This has the beneficial result of reducing acid rain while enabling high sulfur content fuels to be ore widely used without increasing the level of pollution.

The advantages and improved results furnished by the method and apparatus of the present invention are apparent from the foregoing description of the preferred embodiment of the invention. Various changes and modifications may be made without departing from the spirit and scope for the invention as described in the appended claims.

What is claimed is:

1. A method comprising:
   a) pyrolyzing a sulfur bearing fuel together with oil shale containing calcium compounds to produce a combustible gaseous product containing entrained particulate, and a carbonaceous residue product;
   b) separately combusting said residue product with excess air at a temperature sufficient to produce hot gases and hot particulate;
   c) separating said hot particulate from said hot gases to produce substantially particulate-free hot gases;
   d) separating particulate from said combustible gaseous product to form combustible gases substantially free of particulate; and
   e) mixing said substantially particle-free hot gases with said combustible gases substantially free of particulate to form a gaseous mixture substantially free of particulate.

2. A method according to claim 1 including burning said gaseous mixture substantially free of particulate in a combustion chamber and producing products of combustion.

3. A method for using sulfur-bearing crude oil comprising steps of:
   a) processing said crude oil to produce at least one essentially sulfur free component and sulfur rich component;
   b) mixing the sulfur rich component with oil shale containing calcium carbonate to obtain a mixture; and
   c) pyrolyzing said mixture to produce combustible gases, particulates of calcium compounds entrained in said combustible gases, and a carbonaceous residue containing calcium compounds;
   (d) combusting said residue with excess air to produce hot particulate that includes calcium sulfate, and hot gases;

(e) separating particulate from said hot gases to form hot gases substantially free of particulate;

(f) separating particulate from said combustible gases to form combustible gases substantially free of particulate; and g) mixing said hot gases substantially free of particulate with said combustible gases substantially free of particulate to form a gaseous mixture substantially free of particulate.

4. A method according to claim 3 including burning said gaseous mixture in a combustion chamber of a boiler.

5. A method comprising:

a) pyrolyzing with heat provided by hot particulate, a sulfur bearing fuel together with oil shale containing calcium compounds to produce a combustible gaseous product containing entrained particulate, and a carbonaceous residue product;

b) combusting said residue product with excess air to produce hot gases and hot particulate entrained in said hot gases;

c) separating said hot particulate from said hot gases to produce substantially particulate-free hot gases, and supplying the separated hot particulate to the pyrolysis of step (a) above; and d) separating particulate from said combustible gaseous product to form combustible gases substantially free of particulate.

6. A method according to claim 3 wherein said sulfur bearing fuel is residual oil.

7. A method according to claim 3 including burning said combustible gases substantially free of particulate in a combustion chamber.

8. A method according to claim 7 wherein separation of said hot particulate from said hot gases is effective to produce substantially particulate-free hot gases which are applied to said combustion chamber.

9. A method for using sulfur-bearing crude oil comprising steps of:

(a) processing said crude oil to produce an essentially sulfur free component and a sulfur rich component;

(b) mixing said sulfur rich component with oil shale containing calcium carbonate to obtain a mixture;

(c) pyrolyzing said mixture with heat provided by hot particulate to produce a combustible gas containing entrained particulate, and a carbonaceous residue;

(d) combusting said carbonaceous residue with excess air to produce hot particulate entrained in hot gases;

(e) separating particulate entrained in said combustible gas to form combustible gas substantially free of particulate;

(f) separating hot particulate entrained in said hot gases to produce hot gases substantially free of particulate, and supplying the separated hot particulate to the pyrolysis of step (c) above; and (g) combining said combustible gas substantially free of particulate with said hot gases substantially free of particulate to form a gaseous mixture substantially free of particulate.

10. A method according to claim 9 including burning said gaseous mixture in a combustion chamber.

11. A method comprising;

a) pyrolyzing with heat provided by applied hot particulate, a sulfur bearing fuel together with oil shale containing calcium compounds to produce a combustible gaseous product in which particulate is entrained, and a carbonaceous residue;

b) separately combusting said residue with excess air to produce hot particulate entrained in hot gases;

c) separating hot particulate entrained in said combustible gaseous products to form combustible gases substantially free of particulate;

d) separating hot particulate entrained in said hot gases to produce hot gases substantially free of particulate, and a stream of hot particulate;

e) applying said stream of hot particulate to the pyrolysis of step (a) above; and f) combining said combustible gases substantially free of particulate with said hot gases substantially free of particulate to form a gaseous mixture substantially free of particulate.

12. A method according to claim 11 wherein said sulfur-bearing fuel is residual oil.

13. A method according to claim 11 wherein said sulfur-bearing fuel is a solid.

14. A method according to claim 11 wherein the fuel and oil shale are mixed to form a mixture prior to the step of pyrolyzing.

15. A method according to claim 11 wherein said sulfur-bearing fuel is a liquid.

16. A method according to claim 11 including burning said gaseous mixture in a combustion chamber.

17. Apparatus comprising:

a) a mixer for mixing a sulfur bearing, non-solid fuel with oil shale containing calcium carbonate to form a mixture;

b) a pyrolysis chamber for pyrolyzing said mixture and producing combustible gases, calcium compound particulate entrained in said combustible gases, and a residue;

c) a reaction chamber for receiving said residue and reacting the same with excess air to form a mixture of hot gases and calcium sulfate particulate entrained in said hot gases;

d) a separator for separating particulate from said hot gases to form hot gases substantially free of particulate;

e) a separator for separating particulate from said combustible gases to form combustible gases substantially free of particulate;

f) means for mixing the combustible gases substantially free of particulate with the hot gases substantially free of particulate to form a gaseous mixture.

18. Apparatus according to claim 17 including a combustion chamber for burning said gaseous mixture and producing products of combustion.

19. Apparatus according to claim 18 including means responsive to the products of combustion produced by said combustion chamber for generating electricity.

20. Apparatus comprising:

a) a fuel source containing two different fuels, one being calcium-bearing oil shale, and the other being sulfur-bearing fuel;

b) a pyrolyzer constructed and arranged to pyrolyze applied fuels using heat provided by hot particulate to produce a combustible gaseous product containing entrained particulate, and a carbonaceous residue product;

c) means for applying said different fuels to said pyrolyzer;

d) a combustor for combusting said residue product with excess air to produce hot gases and hot particulate entrained in said hot gases;

e) a first separator for separating said hot particulate from said hot gases;

f) means for applying hot particulate from said first separator to said pyrolyzer; and g) a second separator for separating particulate from said combustible gaseous product to form combustible gases substantially free of particulate.

21. Apparatus according to claim 20 wherein said sulfur-bearing fuel is residual oil.

22. Apparatus according to claim 20 including a combustion chamber for burning said combustible gases substantially free of particulate.

23. Apparatus according to claim 22 wherein said first separator produces hot gases substantially free of particulate, including means for applying said hot gases substantially free of particulate to said combustion chamber.

24. Apparatus comprising:

a) a mixer for mixing a sulfur bearing fuel with oil shale to form a mixture;

b) a pyrolysis chamber for pyrolyzing said mixture with heat from applied hot particulate, and producing hot combustible gases in which particulate material is entrained, and a residue c) a combustion chamber for receiving said residue and combusting the same with excess air to form a mixture of hot gases and entrained particulate;

d) a separator for separating particulate material entrained in said combustible gases to form combustible gases substantially free of particulate;

d) a separator for separating particulate entrained in said hot gases to produce hot gases substantially free of particulate, and a stream of hot particulate;

e) means for applying said stream of hot particulate to said pyrolysis chamber; and f) means for combining said combustible gases substantially free of particulate with said hot gases substantially free of particulate to form a gaseous mixture substantially free of particulate.

* * * * *